H. SMITH.  Improvement in Horse Power. 2 Shts. Sht. 1.
No. 120,678.  Patented Nov. 7, 1871.

H. SMITH.  
Improvement in Horse Power.  
No. 120,678.  
Patented Nov. 7, 1871.

*Reissued Jany. 7th 1873.*

120,678

UNITED STATES PATENT OFFICE.

HEMPHILL SMITH, OF SHELBY STATION, TENNESSEE.

IMPROVEMENT IN HORSE-POWERS.

Specification forming part of Letters Patent No. 120,678, dated November 7, 1871.

*To all whom it may concern:*

Be it known that I, HEMPHILL SMITH, of Shelby Station, in the county of Shelby and State of Tennessee, have invented a new and Improved Horse-Power; and I do hereby declare that the following is a full, clear, and exact description, which will enable others skilled in the art to make and use the same, reference being had to the accompanying drawing forming a part of this specification.

Figure 1:
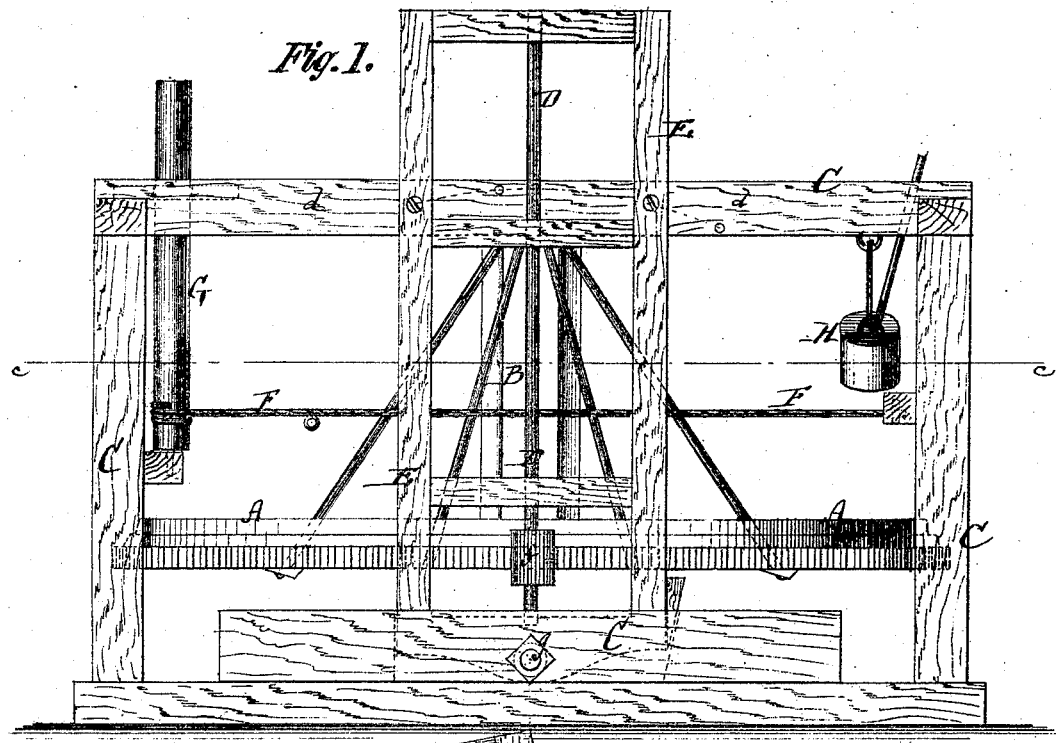
Figure 2:
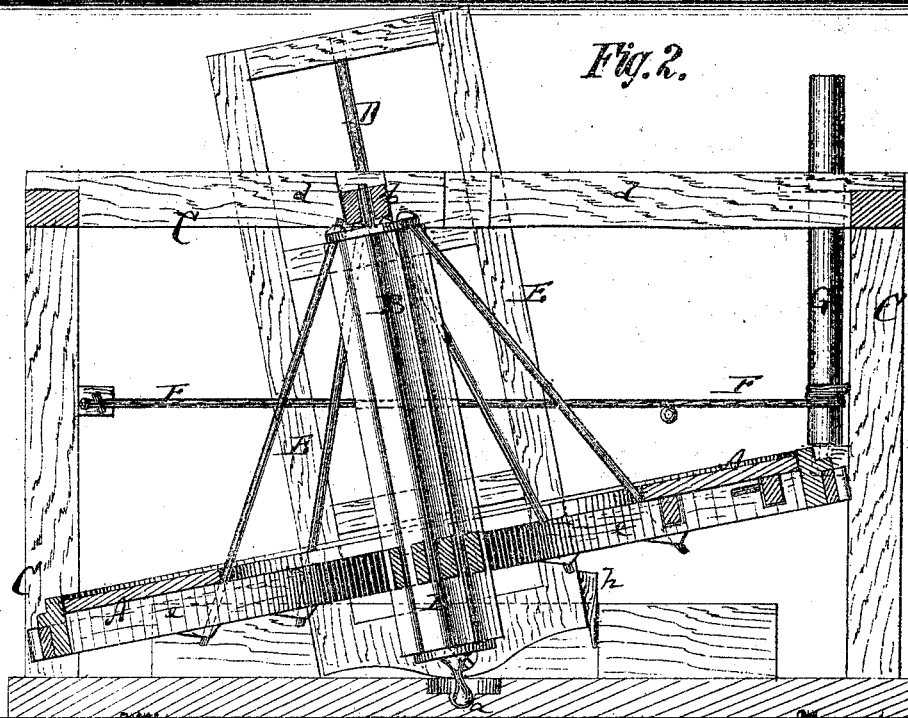
Figure 3:
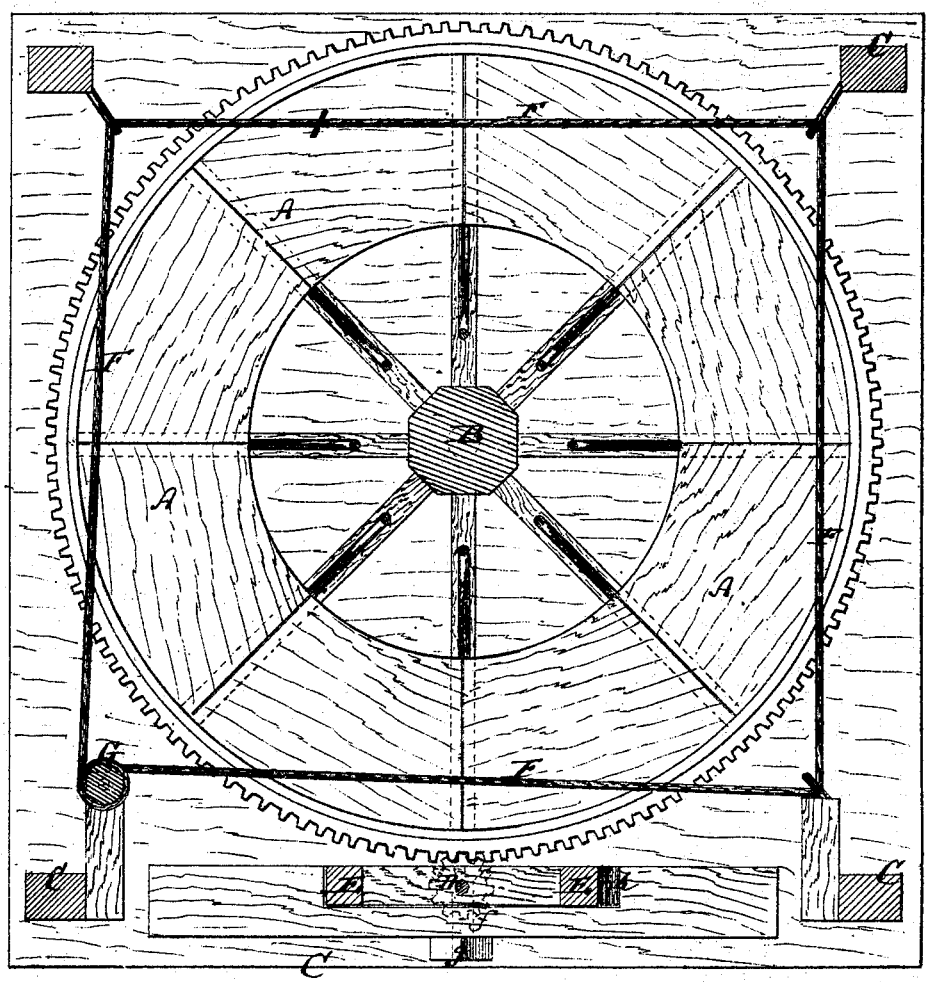

Figure 1 represents a side elevation of my improved horse-power, showing the wheel in a horizontal position. Fig. 2 is a side elevation of the same, showing it in an inclined position. Fig. 3 is a horizontal section of the same taken on the plane of the line $c\,c$, Fig. 1.

Similar letters of reference indicate corresponding parts.

This invention relates to an improved arrangement of draft-rope, windlass, and weight in connection with the frame of a horse-power, as for purposes hereinafter described and set forth.

A in the drawing represents the power-wheel of my improved horse-power. B is the shaft upon which it is mounted. The lower end of this shaft rests in a step, $a$, which is secured in the bed of the supporting-frame C. The upper end of the shaft turns in a movable cross-piece, $b$, which is held between longitudinal beams $d\,d$ of the frame C. When the wheel is in a horizontal position it can be used as a tread-wheel, its surface being properly floored for that purpose. When the flooring is removed the wheel can be used as a draft-wheel by hitching the animal to its radial arms $e\,e$. The periphery of the wheel A is toothed and meshes into the teeth of a pinion, $f$, that is mounted upon a vertical shaft, D. In whatever manner the wheel A may be revolved it will impart rotary motion to the shaft D and thence to the machinery with which it is connected. The shaft D has its bearings in a frame, E, which is, at $g$, pivoted to the frame C. When the wheel A is to be inclined the cross-piece $b$ is shifted, in the beams $d$, into the position shown in Fig. 2. The frame E is then also swung to the side and locked by wedges $h$, so that the shafts B and D will be parallel. The beams $d$ are notched or grooved for the reception of the cross-piece $p$ in the several positions. The wheel can thus be used either inclined or horizontally, and, in the latter position, either as a tread-wheel or draft-wheel. When used as a tread-wheel the rope E is stretched along the frame C and connected with a windlass, G, which may have a ratchet and pawl to be prevented from unwinding. The horses are hitched to this rope, the windlass serving to equalize their power. In connection with the rope I may use weights H suspended at the corners of the frame C. The horses are hitched to these weights and their breast-straps connected with the rope. Their power will be increased the more they draw on the weights while treading on the wheel. This arrangement of rope and weight serves properly to control the animals during action and dispense with the driver.

Having thus described my invention, I claim as new and desire to secure by Letters Patent—

1. The draft-rope F and windlass G applied to the frame C of a horse-power, substantially as and for the purpose herein shown and described.

2. The draft-weight H applied to the horse-power, in combination with the rope F, as specified.

HEMPHILL SMITH.

Witnesses:
A. R. BARRET,
W. SLAUGHTER.

(159)